(12) United States Patent
Kim et al.

(10) Patent No.: US 6,835,449 B2
(45) Date of Patent: Dec. 28, 2004

(54) NANOSTRUCTURED TITANIA COATED TITANIUM

(75) Inventors: George E. Kim, Quebec (CA); Jimmy Walker, Jr., Houston, TX (US); John B. Williams, Jr., Houston, TX (US)

(73) Assignee: Mogas Industries, Inc., Houston, TX (US)

( * ) Notice: Subject to any disclaimer, the term of this patent is extended or adjusted under 35 U.S.C. 154(b) by 87 days.

(21) Appl. No.: 10/064,666

(22) Filed: Aug. 5, 2002

(65) Prior Publication Data

US 2003/0049449 A1 Mar. 13, 2003

Related U.S. Application Data

(60) Provisional application No. 60/322,206, filed on Sep. 12, 2001.

(51) Int. Cl.$^7$ .............................. B32B 5/16; C01G 23/00
(52) U.S. Cl. ....................... 428/328; 251/359; 251/368; 423/68; 423/69; 423/82; 428/333
(58) Field of Search ................................ 428/323, 328, 428/333; 423/68, 69, 82, 86; 251/359, 368, 315.03, 314; 239/650

(56) References Cited

U.S. PATENT DOCUMENTS

| | | | | |
|---|---|---|---|---|
| 3,628,921 A | * | 12/1971 | Hill | |
| 3,660,173 A | * | 5/1972 | Matsuno et al. | |
| 3,837,894 A | * | 9/1974 | Tucker | |
| 4,219,358 A | * | 8/1980 | Hayashi et al. | |
| 4,728,078 A | | 3/1988 | Oda et al. | 351/360 |
| 4,771,803 A | | 9/1988 | Berchem et al. | 137/375 |
| 4,832,075 A | | 5/1989 | Dubach | 137/512 |
| 5,082,741 A | * | 1/1992 | Taira et al. | |
| 5,183,068 A | | 2/1993 | Prosser | 137/1 |
| 5,419,824 A | * | 5/1995 | Weres et al. | |
| 5,441,235 A | | 8/1995 | Narasimhan et al. | 251/368 |
| 5,545,337 A | * | 8/1996 | Hong | 210/761 |
| 5,595,642 A | * | 1/1997 | Xue et al. | 205/591 |
| 5,776,239 A | * | 7/1998 | Bruno | |
| 5,874,134 A | | 2/1999 | Rao et al. | 427/446 |
| 5,939,146 A | | 8/1999 | Lavernia | 427/446 |
| 5,993,513 A | * | 11/1999 | Fife | 75/743 |
| 6,025,034 A | | 2/2000 | Strutt et al. | 427/450 |
| 6,073,648 A | | 6/2000 | Watson et al. | 137/375 |
| 6,203,895 B1 | * | 3/2001 | Berger et al. | |
| 6,517,804 B1 | * | 2/2003 | Kim et al. | |
| 6,599,467 B1 | * | 7/2003 | Yamaguchi et al. | 419/28 |

OTHER PUBLICATIONS

"High Performance, Severe Service Critical Extraction Ball Valves"; Barrette, E. J.; Proceedings of the 8$^{th}$ National Thermal Spray Conference, Sep. 11–15, 1995, pp. 699–704.
"Applying Nanostructured Materials to Future Gas Turbine Engines"; Gell, Maurice; *JOM*; Oct. 1994, pp. 30–34.
"Thermal Spray Coatings for Ball Valves Used in Nickel/Cobalt Pressure Acid Leaching"; Kim, G.E., Brzezinski, T.A., Leblanc, L., Kharlanova, E., PyroGenesis Inc.; Abstract for ITSC et al; May 2000.
"The Office of Naval Research Materials Division Funding of R&D on Nanostructured Materials"; Kabacoff, L.; http://itri.loyola.edu/nano/us_r_n_,d/03_15.htm; Jan. 1998.

* cited by examiner

*Primary Examiner*—H. Thi Le
(74) *Attorney, Agent, or Firm*—Daniel N. Lundeen; Lundeen & Dickinson, LLP

(57) ABSTRACT

A ball valve for use in the pressure acid leaching of nickel ores is disclosed. The valve has a valve body and a ball centrally positioned in the valve body, which has a central passage rotatable in the valve body between open and closed positions. At least one seat is disposed between the ball and the valve body. The ball and seat each comprise a titanium substrate and an ultrafine or nanostructured titania coating. The titania can include from 5 to 45 volume percent of a second phase material that is immiscible with the titania and exhibits corrosion resistance.

27 Claims, 3 Drawing Sheets

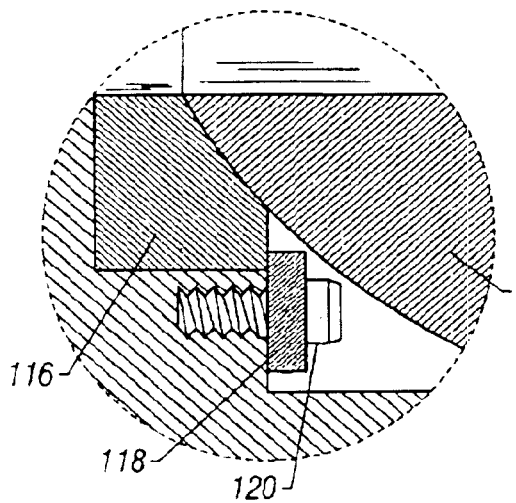
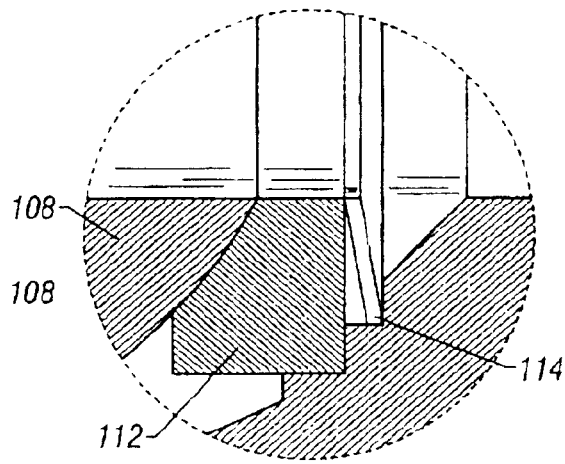
FIG. 3     FIG. 4
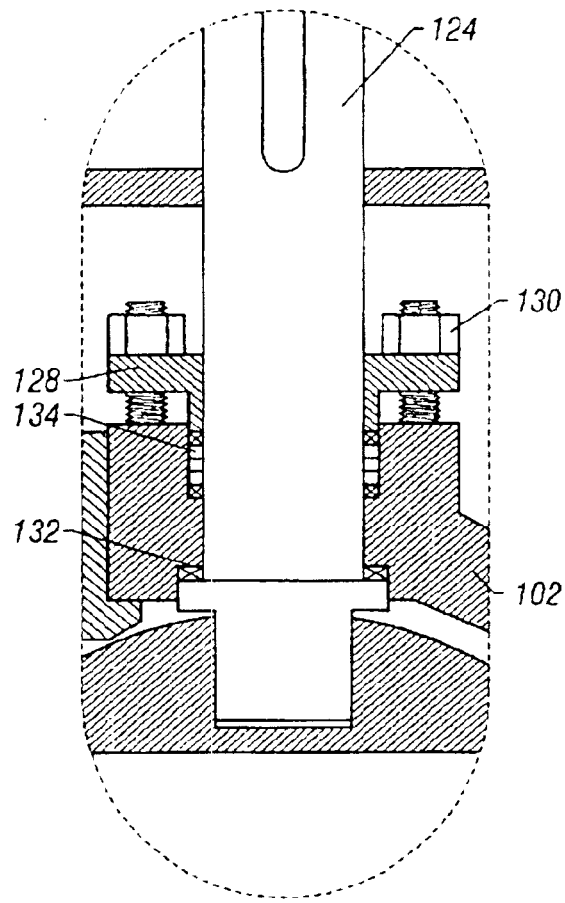
FIG. 5

NANOSTRUCTURED TITANIA COATED TITANIUM

This application claims the benefit of U.S. Provisional Application No. 60/322,206, filed Sep. 12, 2001.

BACKGROUND OF INVENTION

The invention relates to nanostructured titania coatings and more particularly to nanostructured titania-coated titanium balls and seats in ball valves designed for handling very corrosive and abrasive fluids.

Ball valves and other components used in the pressure acid leach process, and especially the nickel-cobalt high pressure acid leach (NiHPAL) process, are subject to a severely corrosive environment of very strong acids and high pressure and temperature. Valve costs typically represent just 1%–2% of the total plant costs; however, their influence on productivity can be much greater. For example, maintenance costs for NiHPAL service are six times greater than originally expected; valve maintenance represents 30%–40% of the total expense.

Conditions that create the severe service in the NiHPAL process include high temperatures, abrasive solids, and acid corrosion. Temperatures are typically 260° C., and process engineers desire to raise this to 288° C., or even 316° C. These temperatures prevent the use of soft sealing materials such as TEFLON or PEEK. The elevated temperatures magnify the corrosivity of the lading and introduce thermal stresses at coating-substrate interfaces. Crushed solids transported through the system abrade and damage the precision sealing surfaces of the valve seats. Solids tend to pack into clearances within the valve internals and prevent proper float of the sealing members, resulting in seat leakage and rapid erosive wear. Corrosion due to the acidic environment can attack and deteriorate precision sealing surfaces, develop corrosion products at the valve coating-substrate interface, and result in spalling of the coating. Corrosion products can also expand to fill tight clearances in seats, again preventing proper float, resulting in seat leakage and rapid erosive wear. Corrosion can cause deterioration of the integrity and wear resistance of the coating.

The limits in the overall performance of severe-service ball valves are constantly being challenged by more arduous operating conditions. In many instances, the exposure of the components to aggressive wear in extremely corrosive environments necessitates a compromise in mechanical integrity to attain sufficient chemical stability. The goal is to reduce or eliminate the compromise in mechanical integrity while maintaining chemical stability.

Severe-service ball valves such as in NiHPAL commonly incorporate coatings to enhance their reliability and life against extreme wear and corrosion. Because of the severe conditions, efforts to reduce the failure rate have included, for example, the use of valve components made from titanium coated with microstructured (grain or particle size in micron range) plasma-sprayed chromium oxide. In many industrial processes, maintenance and downtime associated to valve wear and failure can be substantial; hence, enhancement in the ball valve reliability and life may play an important role in operating costs. Until now, most of the focus on thermal spray coatings of ball valve components has revolved around the composition of microstructured coatings and the method of application. By modifying the microstructure, one can greatly enhance the mechanical properties of the coatings with little or no change to the chemical properties. Although there remain newer coating compositions and deposition methods to be tried, most of the obvious options have been studied.

A particular problem with coating titanium substrates in NiHPAL service is that the coating often has a different coefficient of thermal expansion (CTE) that results in residual stresses due to different rates of thermal expansion and contraction upon heating and cooling, respectively. The presence of excessive residual stress can result in premature spalling (debonding) of the coating from the substrate and/or higher cross-sections of crack formation within the coating. A metallic bond coat has been used to reduce the CTE mismatch between the metallic substrate and the ceramic coating, as well as to provide a physical barrier against substrate corrosion. To date, however, no metallic bond coat layer has been successful to improve performance of the ball valves; this is due to the very high pressures and severe corrosivity of the slurry used in NiHPAL processes, which attacks the bond coat layer and the substrate.

In recent years, much interest in the field of materials science has been focused on the area of ultrafine-grained or nanostructured materials. Nanostructured materials possess a physical feature (e.g., grain size, particle reinforcement) that is less than 100 nm. As used in the present specification and claims, "ultrafine" refers to materials having a physical feature less than 300 nm. These materials have unique properties such as enhanced hardness, wear-resistance, and strength for metals; enhanced toughness and reduced sintering temperature for ceramics; and enhanced wear-resistance and toughness for ceramic-metal composites. Even more recently, there has been a strong effort towards incorporating these enhanced properties onto surfaces of components by way of thermal spray coatings. Representative patents directed to thermal spraying and coatings include, for example, U.S. Pat. No. 5,874,134 to Rao et al.; U.S. Pat. No. 5,939,146 to Lavernia; and U.S. Pat. No. 6,025,034 to Strutt et al.; each of which is hereby incorporated herein by reference.

A critical requirement in any thermal spray process is attaining a starting powder with a certain size range and composition. For ultrafine-grained coatings, one approach is in using agglomerated ultrafine-grained powder of the required size and composition. An agglomerated powder is required since the ultrafine particles are much too fine to be fed through conventional powder feeders; the fine powders would also vaporize upon exposure to the hot section of the jet or flame.

Thermal spray processes are commonly used to heat and accelerate the feed particles onto a substrate, thereby forming a coating. Due to the high thermal energy required to sufficiently soften or melt ceramic particles, not all thermal spray systems are feasible for depositing ceramic coatings.

SUMMARY OF INVENTION

The present invention is directed to nanostructured titania coatings that can be prepared by thermal spray coating ultrafine titania agglomerates onto a titanium substrate surface. The abovementioned and other deficiencies of the prior art are overcome or alleviated by the methods of the present invention, which will enhance the reliability and the life of ball valves by incorporating superior coatings with ultrafine-grain size.

In one aspect, the present invention provides spherical agglomerates useful in thermal spray coating. The agglomerates have a size range of from 5 to 100 microns, preferably 10 to 45 microns, and comprise a mixture of ultrafine titania particles of less than 0.3 microns, and from 5 to 45 volume percent, by total volume of the particles, of ultrafine particles selected from the group consisting of zirconia, tantalum oxide, boron carbide, silicon carbide, titanium carbide, diamond and combinations thereof.

In another aspect the present invention provides an ultrafine, preferably nanostructured titania coating bonded directly on a substrate of titanium. The coating can have a thickness of up to 500 microns, or be ground and polished to 100 to 200 microns. The coating includes a grain growth-inhibiting proportion of a second phase material immiscible with the titania. Preferably, the coating includes from 5 to 45 volume percent of a material selected from the group consisting of zirconia, tantalum oxide, boron carbide, silicon carbide and combinations thereof. In a preferred embodiment, the coating has a ground and polished surface.

A further aspect of the invention is the provision of a method for applying an ultrafine, preferably nanostructured titiania coating. The method includes the steps of: (a) preparing agglomerates comprising a mixture of ultrafine titania particles and ultrafine second-phase particles that are immiscible with titania and corrosion resistant; (b) thermally spraying the agglomerates onto a substrate surface to deposit a coating of ultrafine titania thereon; and (c) optionally grinding and polishing the coating. The substrate is preferably titanium. The mixture can include from 5 to 45 volume percent, by total volume of the particles, of ultrafine second-phase particles selected from the group consisting of zirconia, tantalum oxide, boron carbide, silicon carbide, titanium carbide, diamond and combinations thereof.

Yet another aspect of the invention is the provision of a ball valve for handling very corrosive fluids and abrasive solid particles in a pressure leaching process. The ball valve includes a valve body, a ball centrally positioned in the valve body and having a central passage rotatable in the valve body between open and closed positions, and at least one seat disposed between the ball and the valve body. The ball and seat each comprise a titanium substrate and an ultrafine, preferably nanostructured titania coating. The coating can have a titania phase and a phase immiscible with the titania phase in a proportion effective to inhibit grain growth. The immiscible phase preferably comprises from 5 to 45 percent by volume of the coating. The immiscible phase can be selected from zirconia, tantalum oxide, boron carbide, silicon carbide, titanium carbide, diamond and combinations thereof. The coating can have a ground and polished surface. The coating can have a thickness from 100 to 500 microns, or preferably when it has a ground and polished surface, a thickness of from 100 to 200 microns. The titania coating preferably has a grain size less than 500 nm. The coating is preferably deposited by thermal spray application of a powder comprising spherical agglomerates in a size range of from 10 to 45 microns comprising a mixture of ultrafine particles of less than 0.3 microns.

A still further aspect of the invention is a pressure acid leaching process comprising alternately opening the ball valve just described to allow passage of an acid leach mixture comprising abrasive particles and closing the ball valve to stop said passage, wherein the ball and seat are protected from wear by the titania coating.

A further aspect is a system for applying an ultrafine, preferably nanostructured titiania coating. The system includes means for preparing agglomerates comprising a mixture of ultrafine titania particles, a reservoir comprising a charge of the titania agglomerates, and means for thermally spraying the agglomerates from the reservoir onto a substrate surface to deposit a coating of ultrafine titania thereon.

BRIEF DESCRIPTION OF DRAWINGS

FIG. 3 is an enlarged view of the section of the ball valve appearing in circle 3 of FIG. 2.

FIG. 4 is an enlarged view of the section of the ball valve appearing in circle 4 of FIG. 2.

FIG. 5 is an enlarged view of the section of the ball valve appearing in oval 5 of FIG. 2.

DETAILED DESCRIPTION

Critical ball valve components, such as balls and seats, benefit from the application of ultrafine-grained or nanostructured coatings according to the present invention. The coating composition consists essentially of titanium oxide ($TiO_2$), but can include other chemically stable compounds that form a second phase. These second phase compounds are generally immiscible with the titanium oxide and must be resistant to corrosion in the nickel-cobalt high pressure acid leach (NiHPAL) process. As used herein, the expression "corrosion resistant" means that the material has corrosion resistance at least similar to that of titanium oxide in NiHPAL service, e.g. 30 weight percent laterite ore in 98 weight percent sulfuric acid at over 250° C. and 4000 kPa. At least one of the components has to maintain a grain size of 500 nm or less, preferably less than 300 nm. Exemplary second-phase compounds include, but are not limited to, zirconium oxide ($ZrO_2$), tantalum oxide ($Ta_2O_5$), boron carbide ($B_4C$), silicon carbide (SiC), titanium carbide (TiC), diamond, combinations thereof, and the like. The relative quantities of the second phase can range from 5 vol % to 45 vol %, e.g., $TiO_2$-$20Ta_2O_5$ and $TiO_2$-$45ZrO_2$.

An important aspect in selecting coating compositions relates to the fact that having a composite material consisting of two or more fine, well-distributed, and immiscible particles can substantially reduce grain growth (by grain boundary pinning) at elevated temperatures. Since thermal spray application of ceramic coatings relies on heating the particles to molten or semi-molten states, mitigation of grain growth to maintain an ultrafine-grained coating is of great importance. Also, some wear applications may involve a certain degree of exposure to elevated temperatures after the coated ball valve surfaces are placed in industrial use; if the coating does not possess a means of stabilizing the ultrafine grain structure, the associated grain growth could change the coating properties.

Titanium oxide as the coating base material has an additional benefit for NiHPAL applications, where valves are typically fabricated from solid titanium. The benefit stems from the similar coefficient of thermal expansion (CTE) for both the oxide and metallic states of titanium. This is especially important in thermal spray coatings where residual stresses may form within the coating and at the coating-substrate interface due to differences in thermal expansion and contraction during spraying and cooling, respectively. The similar CTE inhibits premature spalling and minimizes the cross-sections of crack formation within the coating. In addition, the good match in CTE and the good corrosion resistance of the titanium (by forming a passivated layer of titanium oxide) excludes the need for adding a metallic bond coat.

Figure 1:
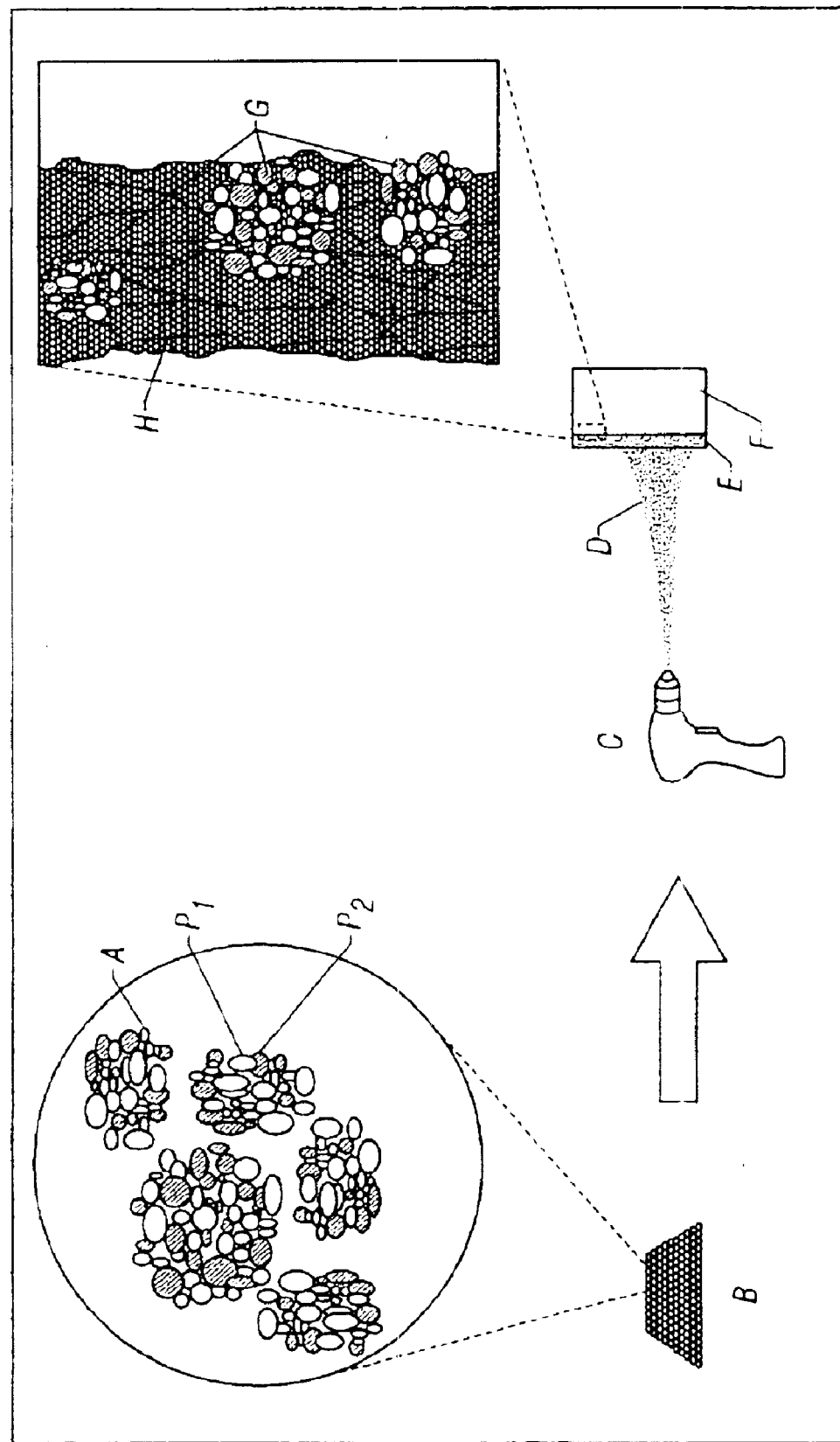
FIG. 1 is a schematic illustration of the process of thermally spraying a substrate with a two-phase nanostructured titania coating.
Figure 2:
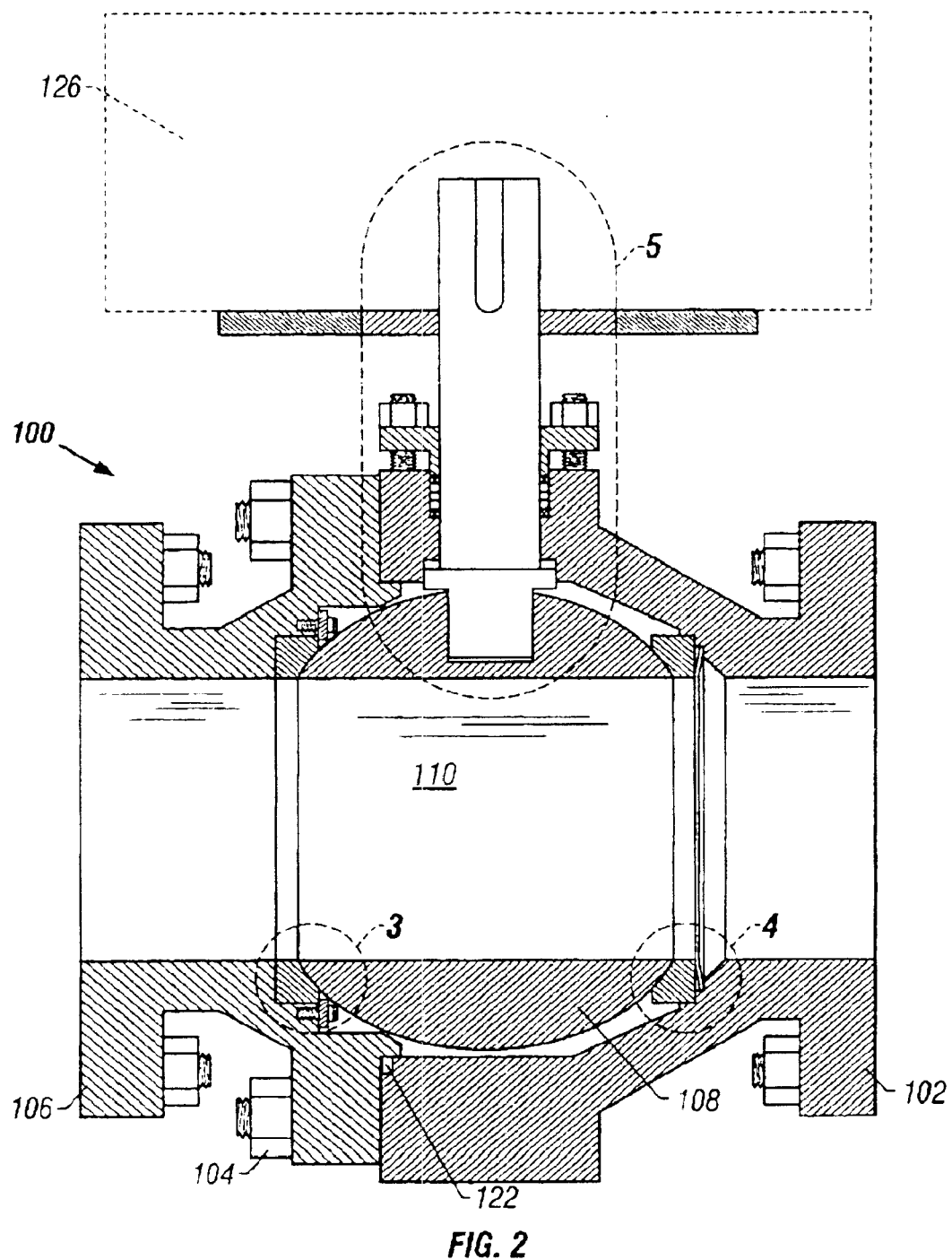
FIG. 2 is a cross-sectional view of a ball valve according to one embodiment of the invention.

The agglomerated nanostructured composite powder B(see FIG. 1) for thermal spray application can be produced by well-known methods for producing agglomerates of ultrafine particles. A method that is particularly well suited for the present invention includes the following steps: (1) ball milling appropriate mixtures of commercial (micron size range) $TiO_2$ and second phase powders down to below 500 nm particle size range; (2) spray drying with appropriate binders to form spherical agglomerate powder; and in some cases, (3) pressureless sintering. The final sprayable powder B consists primarily of spherical agglomerates A, in the size range of 5 to 100 µm, preferably 10 to 45 µm, depending on the type of thermal spray process to be used, and composed of a mixture of ultrafine titania particles $P_1$ and ultrafine second phase particles $P_2$ (<300 nm).

The surface of the titanium substrate is preferably pretreated for deposition of the nanostructured titania by precision roughening to 2–3 mils. This can be achieved by impacting the substrate surface with aluminum oxide or other abrasive particles using conventional sand blasting equipment, followed by cleaning the surface with a solvent and a brush to remove as many of the residual abrasive particles as possible. The alumina particles preferably have a size in the range of 20 to 36 microns. The pretreated surface can be dried by heating to above 100° C.

To deposit a coating E on a substrate F, the agglomerated powder B is fed, via conventional thermal spray powder feeders, into the hot-section D of the plasma jet or combustion flame from a commercially available thermal spray torch C, where the agglomerated particles A are heated and accelerated towards the component surface. Due to the high melting temperatures of the ceramic powders, thermal spray processes with relatively high thermal output, i.e., commercially available plasma spray and higher-temperature combustion spray systems are used to apply the coatings, including for example, flame spraying, atmospheric plasma spraying, controlled atmosphere plasma spraying, arc spraying, detonation or D-gun spraying, high velocity oxy-fuel spraying, vacuum plasma spraying, and the like. The particles can experience some grain growth during deposition; however, the final coating grain size should remain below 500 nm due to the grain boundary pinning.

In a preferred embodiment, the thermal spray process comprises the atmospheric plasma spray (APS) process. In the APS process, a jet of gas is heated by an electric arc to form a plasma jet. Powder feedstock is injected into the plasma jet to heat the particles and to accelerate them towards a substrate to form a coating. The spray parameters preferably include a gun current of 400 to 500 amps, a primary gas (argon or nitrogen) flow rate of 36 to 48 SLPM, a secondary (hydrogen) gas flow rate of 7 to 12 SLPM, a spray distance of 50 to 80 mm, a powder feed rate of 36 to 60 g/min, a maximum substrate surface temperature of 200° C., and a spray thickness of 125 to 500 microns. The coated substrate is then allowed to cool to ambient temperature.

Numerous deposition passes of the impinging particles are normally required to build up the coating E. The coating E is characterized by lamellae H, also known as splats, that form when substantially molten particles impinge on the substrate surface. The coating E also includes non-molten particles G, which can also include partially molten particles. These non-and/or partially-molten particles are collectively referred to herein as non-molten particles. The coating E has a generally uniform composition and can also include other features such as microcracks and porosity, but should fly to minimize the density of through-microcracks and through-porosity. Typical coating E thicknesses of 100 to 500 microns are deposited, followed by post-spray processing, such as, for example, conventional grinding and polishing to a mirror-like smoothness of 8 RMS or better. The final coating thickness is preferably 100 to 200 microns.

The ultrafine-grained or nanostructured coating provides enhanced wear-resistance and toughness, as well as superior bond strength to the substrate. Corrosion is minimized by a layer of titanium against the coating, which has been passivated by the titania. If desired, an organic or inorganic sealant can be applied to penetrate the coating and seal any through-micro-cracks and through-porosity. For example, a viscous fluoropolymer can be used to impregnate the coating. The application of vacuum can facilitate through penetration of the fluoropolymer into the coating. These enhanced coating properties, combined with a sound ball valve design, lead to the processing of more reliable and longer lasting valves.

A titanium ball valve 100 according to one embodiment of this invention is pictured in FIGS. 2–5. The ball valve 100 has a titanium body 102 bolted at 104 to titanium end connector 106 to house nanostructured titania-coated titanium ball 108, which has a central bore 110. Nanostructured titania-coated titanium inner annular seat 112 is biased by titanium spring 114. Nanostructured titania-coated titanium outer annular seat 116 is held in position by titanium seat locking ring 118 and screws 120. A gasket 122 provides a seal between the body 102 and the end connector 106, and can be made of a suitable material such as a spiral wound GRAFOIL gasketing. Titanium stem 124 is connected to the ball 108 at one end and a conventional actuator 126 at the other. A packing gland 128 is bolted at 130 to the body 102 around the stem 124. An inner stem seal 132 is made of a conventionally titanium-coated gasket material, or polytetrafluoroethylene, or the like. The primary stem seal 134 is expanded graphite, for example.

In the ball valve 100, the titanium parts are generally Grade 12. The stem 124 and spring 114 can be made from Grade 5 titanium, which provides approximately two times the strength of Grade 12 and allows the use of a smaller diameter stem 124, and hence lower operating torque. Grade 12 or 29 can be used where crevice corrosion is a concern, e.g. chloride concentrations greater than 1000 ppm. Grade 29 offers strength and high resistance to corrosion.

In operation, the ball valve 100 is a bi-directional seated floating ball valve that can be utilized in pressure leach nickel extraction service, for example. The ball valve 100 is designed for easy maintenance and maximum life under severely erosive and corrosive conditions. The ball valve 100 is typically installed as an isolation valve in spare, vent, drain, slurry inlet and discharge applications on a conventional pressure leach autoclave (not shown). The ball valve 100 is alternately opened to allow the passage of fluid and closed to prevent the passage of fluid. The fluid passing through the valve or prevented from passing through the valve can be corrosive and contain abrasive particles. The ball 108 and seats 112, 114 are protected from corrosion and erosion by the titania coatings described above. The use of a retained normal seat prevents solid particle contamination of critical sealing surfaces to maintain dependable sealing properties.

Example 1 A nanostructured titania on titanium ball valve was made by coating the Grade 5 titanium seats 112, 114 and ball 108 of the valve shown in FIGS. 2–5. An atmospheric plasma spray (APS) gun was used, manufactured by Sulzer Metco, model number 7M with a Sulzer Metco feeder, model number 9MP. Prior to applying the coating, the component surface was grit blasted using alumina (20 to 36 microns) to 2–3 mils and heated to above 100° C. The powder used was ultrafine titania agglomerates that had been prepared according to specifications (agglomerates approximately 5 to 45 microns, ultrafine particles approximately 300 nm) by material suppliers. The powder was applied by repeatedly passing the flame over the parts, allowing the parts to cool slightly between passes. The gun current was 400 to 500 A, the primary gas (argon or nitrogen) flow rate was 36 to 48 SLPM, and the secondary gas (hydrogen) flow rate was 7 to 12 SLPM. The powder injection feed rate was 36 to 60 g/min, and the spraying distance was 50 to 80 mm. The part surface temperature was maintained below 200° C. throughout the spray process. The coated ball valve parts were ground and polished to 8 RMS.

Titanium coupons coated in the same manner with the nanostructured titania were subjected to abrasion testing (ASTM G-65) and microhardness evaluation, and compared to a conventional (microstructured) titania coating. The nanostructured coating resulted in a three-fold improvement in abrasion resistance and an approximately 10 percent improvement in microhardness.

Examples 2 and 3 The procedure of Example 1 is repeated, except that the powder is a mixture of 80 volume percent titania nanoparticles and 20 volume percent $Ta_2O_5$ nanoparticles (Example 2), and 55 volume percent titania and 45 volume percent zirconia nanoparticles (Example 3). Relative to the nanostructured titania, the coated valve parts have excellent abrasion resistance (ASTM G-65), sliding wear resistance (ASTM G-77), slurry erosion resistance, tensile adhesion (ASTM C-633), microhardness, and/or corrosion resistance as determined by conventional X-ray diffraction, scanning electron microscopy, electron probe microanalysis, electrochemical analysis and/or pilot autoclave study.

Example 4 An agglomerated ultrafine composite powder for thermal spray application was produced by: 1) milling mixtures of commercial (micron size range) $TiO_2$ and 20 volume percent $Ta_2O_5$ powders down to below 300 nm particle size range; and 2) spray drying with appropriate (1 to 6 weight percent of total solution) organic binders to form spherical agglomerate powder. The milling was carried out in an aqueous-based liquid medium with 30 to 35 weight percent solids. Organic binders used in spray drying included polyvinyl alcohol (PVA) or carboxymethyl cellulose (CMC). The spray-dried powder consisted essentially of spherical agglomerates, in the size range of 10 to 30 μm.

Example 5 An agglomerated ultrafine composite powder for thermal spray application was produced by milling mixtures of commercial (micron size range) $TiO_2$ and 45 volume percent $ZrO_2$ powders down to below 300 nm particle size range and spray drying with appropriate (1 to 6 weight percent of total solution) organic binders to form spherical agglomerate powder. The milling was carded out in an aqueous-based liquid medium with 30 to 35 wt % solids. Organic binders used in spray drying included polyvinyl alcohol (PVA) or carboxymethyl cellulose (CMC). The spray dried powder consisted essentially of spherical agglomerates, in the size range of 5 to 45 μm.

Example 6 An agglomerated nanostructured $TiO_2$ powder for thermal spray application was produced by: 1) spray drying a slurry of very fine (~20 nm) commercial titania particles and organic binders; and 2) heat-treating at 650° C. to promote partial sintering. The resulting powder was classified into two size ranges, 10 to 35 μm and 15 to 50 μm, depending on the type of thermal spray process to be used.

Example 7 An agglomerated ultrafine $TiO_2$ powder for thermal spray application is produced by: 1) ultrasonically dispersing fine (<300 nm) commercial titania particles in a water-based medium with 2 weight percent polyvinylpyrrolidone (PVP) organic binders; and 2) pressureless sintering at 850° C. The resulting powder is classified into two size ranges, 10 to 35 μm and 15 to 50 μm, depending on the type of thermal spray process to be used.

Example 8 An agglomerated ultrafine composite $TiO_2$-base powder for thermal spray application is produced by the following steps: 1) hydriding commercial titanium powder; 2) mixing one part titanium hydride powder with three parts titanium carbide (TiC) powder in a mineral spirit-surfactant solution; 3) milling of the slurry mixture (30–35 weight percent solids) until solids are below 300 nm; 4) spray drying of the milled slurry with CMC binder; and 5) heat-treating at elevated temperatures (above 750° C.). The resulting powder is classified into size ranges appropriate for the type of spray process to be used.

Examples 9–13 An ultrafine/nanostructured titania-base coating on titanium ball valve was made by thermal spraying the Grade 5 titanium seats 112, 114 and ball 108 of the valve shown in FIGS. 2–5. An atmospheric plasma spray (APS) gun was used, manufactured by Sulzer Metco, model number 7M with a Sulzer Metco feeder, model number 9MP. Prior to applying the coating, the component surface was grit blasted using alumina (20–36 microns) to 2–3 mils and heated to above 100° C. The powder used is ultrafine/nanostructured titania and titania-base agglomerates prepared as described in Examples 4–8. Where there is more than one size range available for a powder, the larger-size cut is used. The powder is applied by repeatedly passing the jet over the parts, allowing the parts to cool slightly between passes. The gun current is 400–500 A, the primary gas (argon or nitrogen) flow rate is 36–48 SLPM, and the secondary gas (hydrogen) flow rate is 7–12 SLPM. The powder injection feed rate is 36–60 g/min, and the spraying distance is 50–80 mm. The part surface temperature is maintained below 200° C. throughout the spray process. The as-sprayed coating thickness is between 300 and 500 μm. The coated ball valve parts are ground and polished to 8 RMS and a final coating thickness of 100 to 200 μm. Using the nanostructured titania agglomerates of Example 6, the coating had a hardness of 783 $HV_{0.3}$ and an abrasive volume loss of 28.78 mm³ per ASTM G65, procedure E, compared to a hardness of 759 $HV_{0.3}$ and an abrasion volume loss of 59.83 mm³ for a conventional titania applied with a conventional APS thermal coating process.

Examples 14–18 The same thermal spray approach as in Examples 9–13 using a high-energy plasma spray process to apply the agglomerated nanostructured powders is carried out. A high-energy plasma spray gun is used, manufactured by Sulzer Metco, model number 9M with a Sulzer Metco feeder, model number 9MP. Prior to applying the coating, the component surface is grit blasted using alumina (20–36 microns) to 2–3 mils and heated to about 100° C. Where there is more than one size range available for a powder, the larger-size cut is used. The powder is applied by repeatedly passing the jet over the parts, allowing the parts to cool slightly between passes. The gun power is 60 kW, the primary gas is argon, and the secondary gas is hydrogen. The powder injection feed rate is 20–40 g/min, and the spraying distance is 100–125 mm. The part surface temperature is maintained between 100° and 150° C. throughout the spray process. The as-sprayed coating thickness is between 300 and 500 μm. The coated ball valve parts are ground and polished to 8 RMS and a final coating thickness of 100 to 200 μm.

Examples 19–23 The same thermal spray approach as in Examples 9–18 using a combustion spray process to apply the agglomerated ultrafine/nanostructured powders is carried out. Prior to applying the coating, the component surface is grit blasted using alumina (20–36 microns) to 2–3 mils and heated to above 100° C. Oxygen flow rate of 400–600 SCFH at 100–140 psi in combination with fuel flow rate of 1000–1200 SCFH at 100–140 psi is used. The powder injection feed rate is maintained between 15–30 g/min, and the spraying distance is 152–255 mm. The part surface temperature is maintained below 150° C. throughout the spray process. Where there is more than one size range available for a powder, the smaller-size cut is used. The powder is applied by repeatedly passing the flame over the parts, allowing the parts to cool slightly between passes. The as-sprayed coating thickness is between 300 and 500 $\mu$m. The coated ball valve parts are ground and polished to 8 RMS and a final coating thickness of 100 to 200 $\mu$m. Using the nanostructured titania agglomerates of Example 6, the coating had a hardness of 874 $HV_{0.3}$ and an abrasive volume loss of 16.78 $mm^3$ per ASTM G65, procedure E, compared to a hardness of 759 $HV_{0.3}$ and an abrasion volume loss of 59.83 $mm^3$ for a conventional titania applied with a conventional APS thermal coating process.

The foregoing description of the various embodiments is merely illustrative and intended in a non-limiting sense. Those skilled in the art will readily appreciate various changes and modifications in view thereof. It is intended that all such variations and modifications within the scope or spirit of the appended claims be embraced thereby.

What is claimed is:

1. A ball valve for handling very corrosive fluids and abrasive solid particles in a pressure leaching process, comprising:
    a valve body;
    a ball centrally positioned in the valve body and having a central passage rotatable in the valve body between open and closed positions;
    at least one seat disposed between the ball and the valve body;
    wherein the ball and seat each comprise a titanium substrate and a titania coating;
    wherein the titania coating has a grain size of less than 500 nm.

2. The ball valve of claim 1 wherein the coating comprises a titania phase and a phase immiscible with the titania phase in a proportion effective to inhibit grain growth.

3. The ball valve of claim 2 wherein the immiscible phase comprises from 5 to 45 percent by volume of the coating.

4. The ball valve of claim 2 wherein the immiscible phase is selected from zirconia, tantalum oxide, boron carbide, silicon carbide, titanium carbide, diamond and combinations thereof.

5. The ball valve of claim 1 wherein the coating has a thickness from 100 to 500 microns.

6. The ball valve of claim 1 wherein the coating has a ground and polished surface.

7. The ball valve of claim 6 wherein the coating is deposited by thermal spray application of a powder comprising spherical agglomerates in a size range of from 10 to 45 microns comprising a mixture of ultrafine particles of less than 0.3 microns.

8. The ball valve of claim 7, wherein the titania coating has a uniform composition and is bonded directly to a pre-roughened surface of the titanium substrate.

9. The invention of claim 1 wherein the titania coating comprises nanostructured ultrafine particles.

10. The ball valve of claim 1 wherein the coating has a grain size less than 300 nm.

11. The ball valve of claim 10 wherein the coating comprises a titania phase and a phase immiscible with the titania phase in a proportion effective to inhibit grain growth.

12. The ball valve of claim 11 wherein the immiscible phase comprises from 5 to 45 percent by volume of the coating.

13. The ball valve of claim 11 wherein the immiscible phase is selected from zirconia, tantalum oxide, boron carbide, silicon carbide, titanium carbide, diamond and combinations thereof.

14. The ball valve of claim 10 wherein the coating has a thickness from 100 to 500 microns.

15. The ball valve of claim 10 wherein the coating has a ground and polished finish.

16. The ball valve of claim 15 wherein the coating is deposited by thermal spray application of a powder comprising spherical agglomerates in a size range from 10 to 45 microns comprising a mixture of ultrafine particles of less than 300 nm.

17. The ball valve of claim 1 wherein the coating has a grain size less than 100 nm.

18. The ball valve of claim 1, wherein the coating has a uniform composition.

19. The ball valve of claim 18, wherein the titania coating is bonded directly to the titanium substrate.

20. The ball valve of claim 18, wherein the titania coating is bonded to a roughened surface of the titanium substrate.

21. The ball valve of claim 20 wherein the roughened surface is grit blasted to 2–3 mils (50–80 microns).

22. The ball valve of claim 1, wherein the titania coating is bonded directly to the titanium substrate.

23. The ball valve of claim 1, wherein the titania coating is bonded to a roughened surface of the titanium substrate.

24. The ball valve of claim 23 wherein the roughened surface is grit blasted to 2–3 mils (50–80 microns).

25. A pressure acid leaching process comprising alternately opening and closing the ball valve of claim 1 to respectively allow and stop passage of an acid leach mixture comprising abrasive particles in a solution of sulfuric acid at a temperature above 250° C. and pressure above 4000 kPa.

26. The invention of claim 25 wherein the titania coating comprises nanostructured ultrafine particles.

27. The process of claim 25, wherein the solution is at least 98 percent sulfuric acid.

* * * * *